INVENTOR.
CARL-HERMANN HEISE

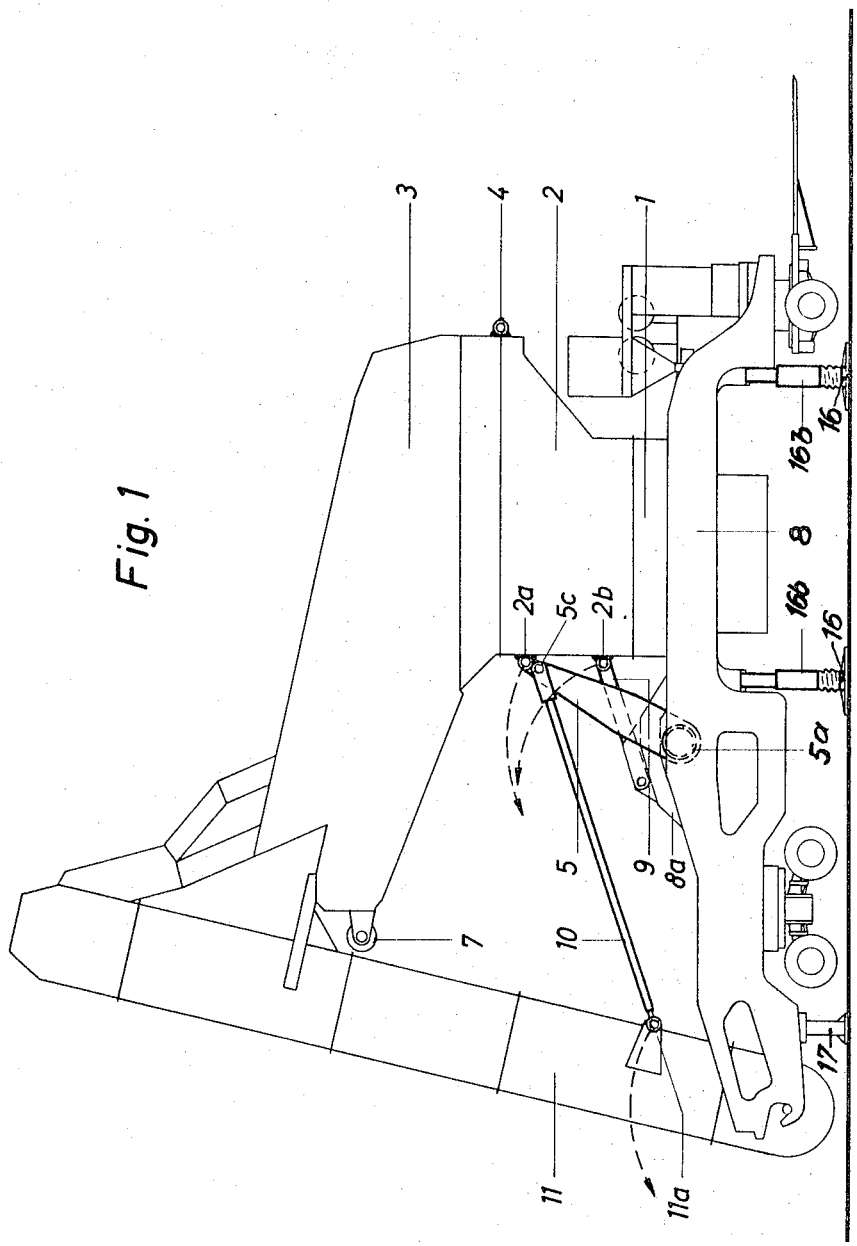

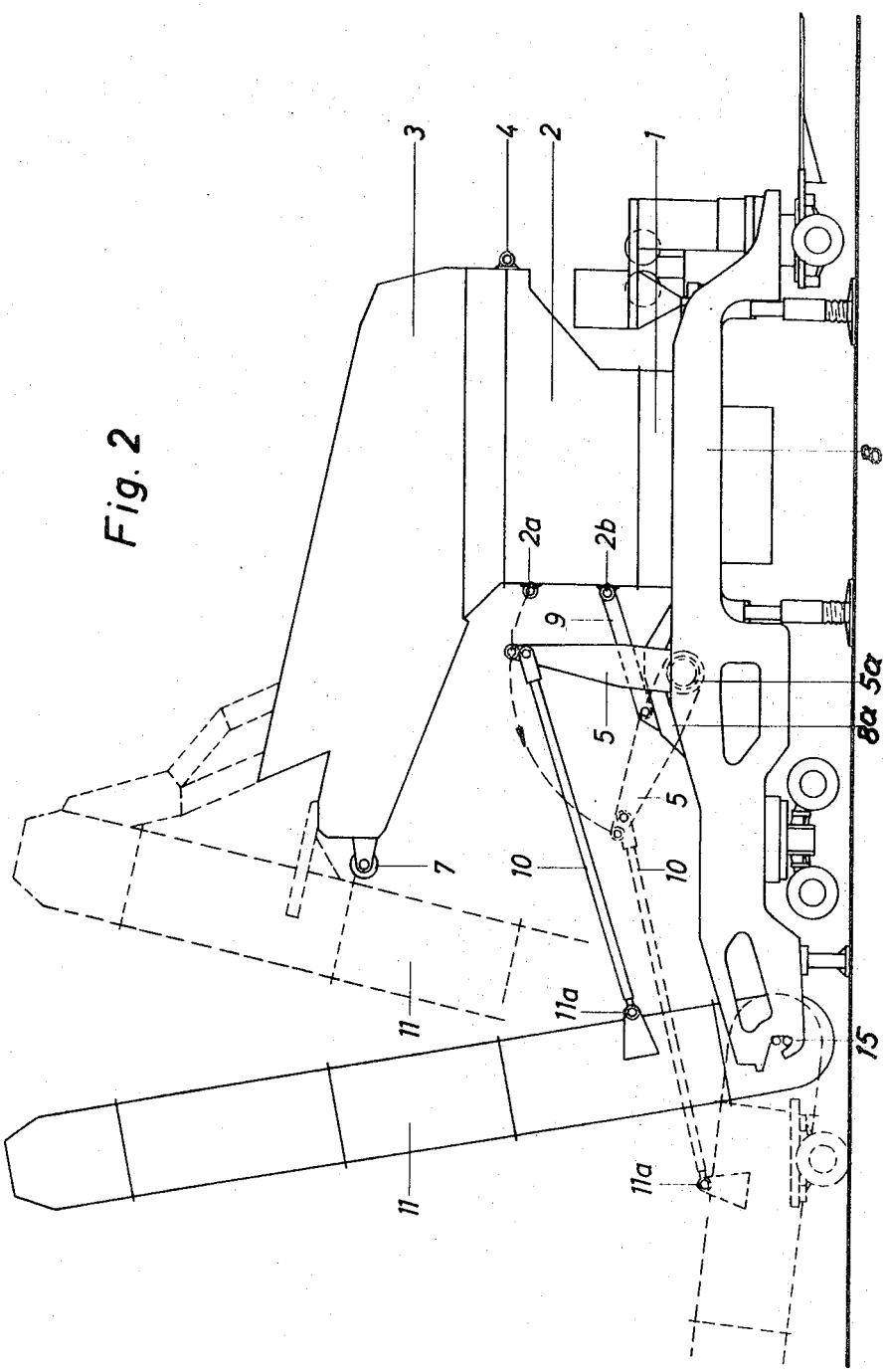

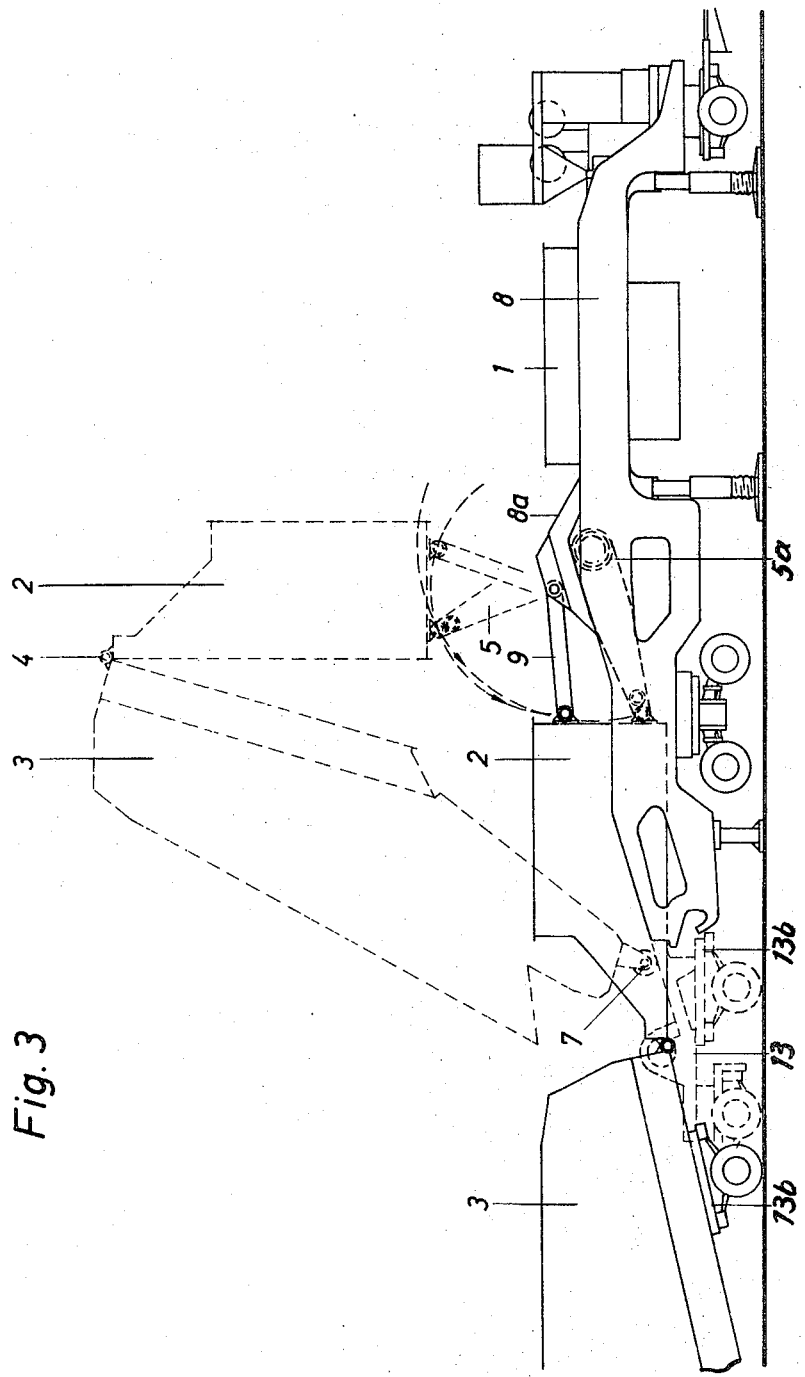

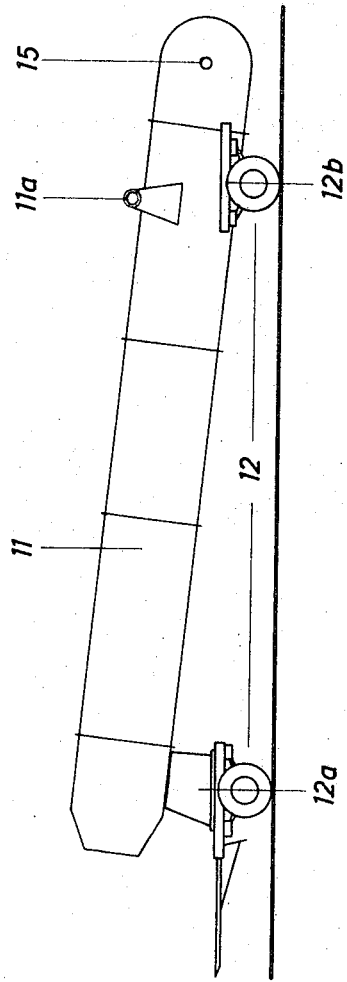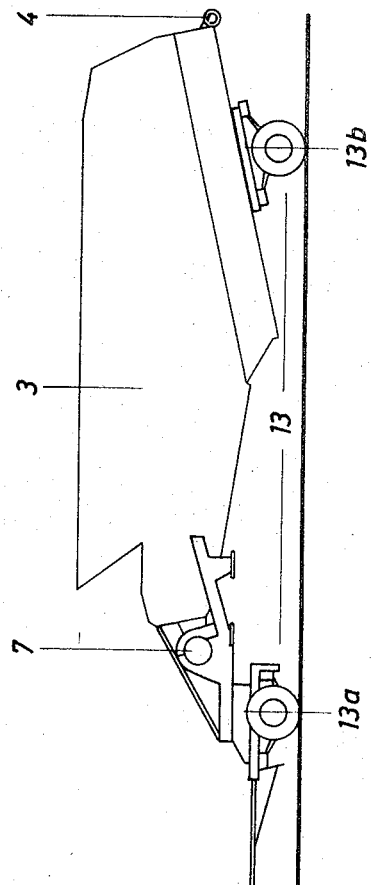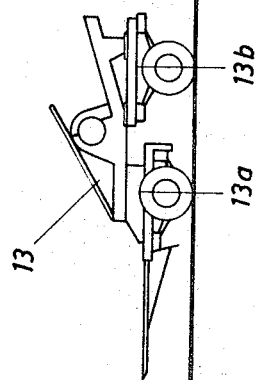

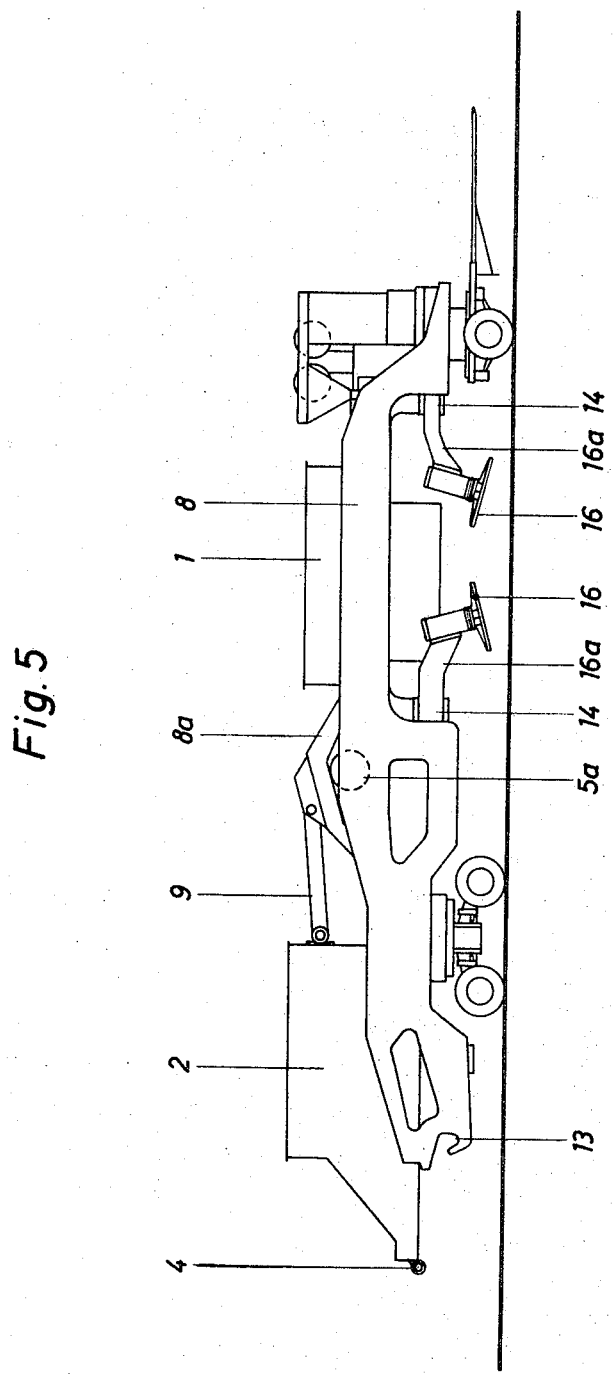

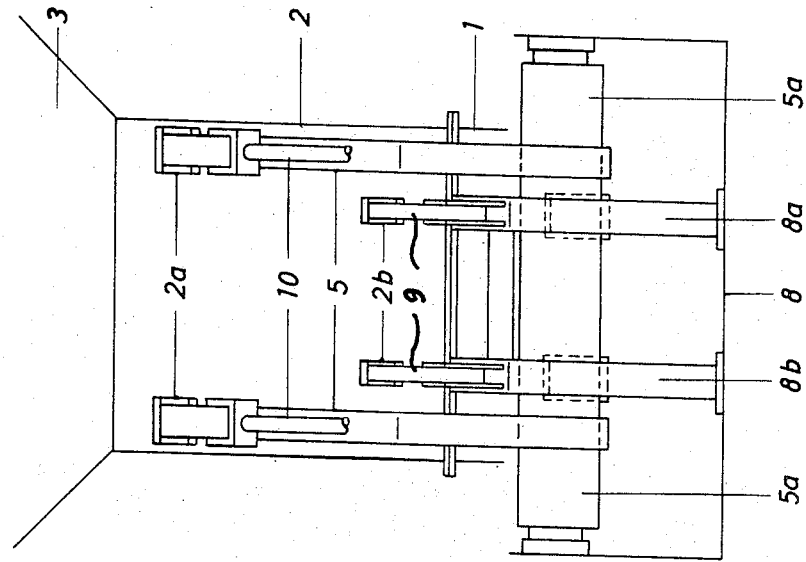
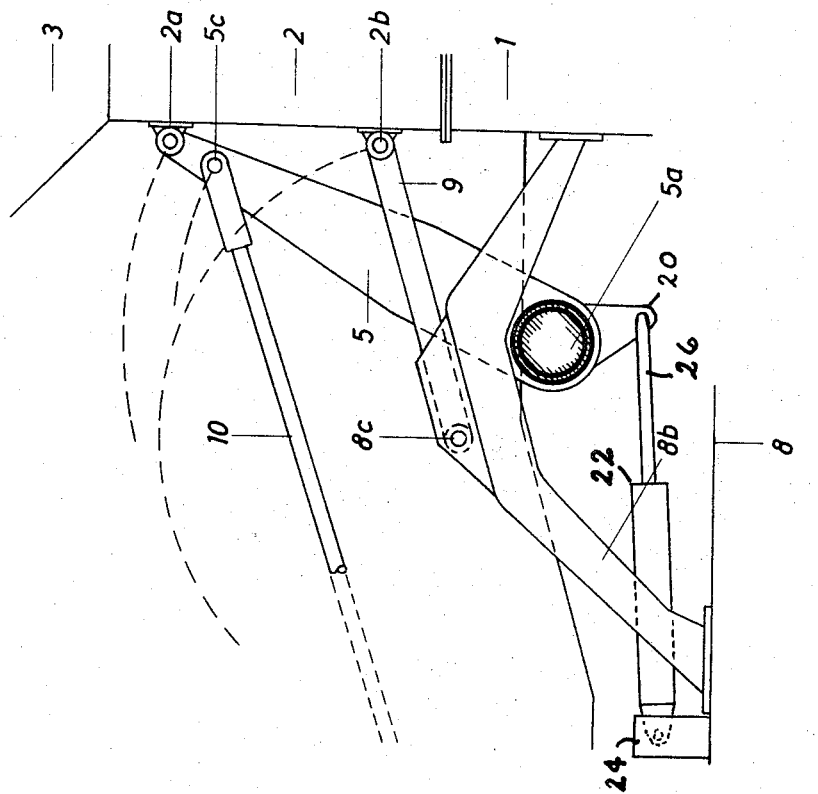

United States Patent Office 3,342,461
Patented Sept. 19, 1967

3,342,461
MOBILE SCREENING AND MIXING MACHINE FOR THE PREPARATION OF BITUMINOUS MIXTURES
Carl-Hermann Heise, Kalandstr. 12, 322 Alfeld (Leine), Germany
Filed Apr. 15, 1965, Ser. No. 448,443
Claims priority, application Germany, May 27, 1964, A 46,141
8 Claims. (Cl. 259—164)

This invention relates to mixing and screening machine for the preparation of bituminous mixtures and more particularly relates to a novel construction of the mixing tower which is composed of several sections some of which are pivotally joined and disengagingly mounted on a vehicle frame.

With increased demands for bituminous mixtures for road building and the like, it is necessary to construct larger mixing and screening machines. Making machines larger in themselves would be a relatively routine matter; however, the problem is aggravated by the fact that these machines must have overall heights which do not exceed certain prescribed dimensions. This is especially true for mobile units which have to be transported over rail or highway facilities which have overhead obstructions such as tunnels and overpasses under which the mobile units must pass to reach the new installation sites. In this respect, the new machines must be made larger in capacity but yet must not exceed certain prescribed dimensions.

In the prior art machines, it is old to rigidly connect a lower portion of the mixing tower to the vehicle frame on which the mixer is transported and to pivotally connect the upper portion of the tower to the lower portion for a pivotal movement about a horizontal axis. In machines of this type, the dust tight swinging screen rests between the track rails which guide the hoisting bucket to the loading silo. In another machine of this variety, the upper portion of a two part mixing tower is seated in the upper dropped portion of the guide frame. These machines have mixing towers which are too small to meet current demands for output.

A primary object of this invention is to provide a mixing tower which has an output capacity greater than that of existing mixing towers and whose overall dimensions in the transport position does not exceed prescribed dimensions.

A further object of this invention is to produce an erectable mixing tower for a moble bituminous mixing machine of large capacity which can readily be erected and which can readily be disengagingly mounted on a vehicle frame for transportation thereon.

This invention is also a further development of the apparatus shown in the German patent 1,132,947.

Generally, the apparatus according to the present invention includes a mobile screening and mixing machine for the production of bituminous mixtures wherein the mixing tower of the machine is composed of several parts. It includes a first portion which is fixedly connected to the vehicle frame and a second portion which is mounted on the first and which second portion is adapted for pivotal movement about a horizontal axis with means secured to one side of said second portion. A third portion is detachably and pivotally secured to said second portion on a side opposed to said one side of said second portion. Means are provided for connecting the disassembled third portion to a vehicle frame on which it is supported and transported.

The third portion mentioned in the above paragraph may be provided with roller means to cooperate with guideways on the mixing machine during the erection of the third portion on the second portion of the mixing tower.

Various other objects and advantages will become apparent upon reference to the following detailed description taken in connection with the drawings in which:

FIGURE 1 is a side view of a transportable screening and mixing machine with its hydraulic props swung out into operative working position;

FIGURE 2 is a side view showing the swinging movement of the hot bucket conveyor;

FIGURE 3 is a side view showing the swinging movement of portion 3 of the mixing tower;

FIGURE 4 shows the hot bucket conveyor resting on auixiliary truck sections;

FIGURE 4a shows the upper portion 3 of the mixing tower resting on auxiliary truck sections;

FIGURE 4b shows the auxiliary truck sections in collapsed relation;

FIGURE 5 shows the mixing tower portion 2 resting on the transport vehicle with the hydraulic props in lifted transport positions;

FIGURE 7 is a fragmentary cross section showing the swinging mechanism; and

FIGURE 8 is a rear view of the hydraulically operated shaft with the swinging arms.

Figure 6:
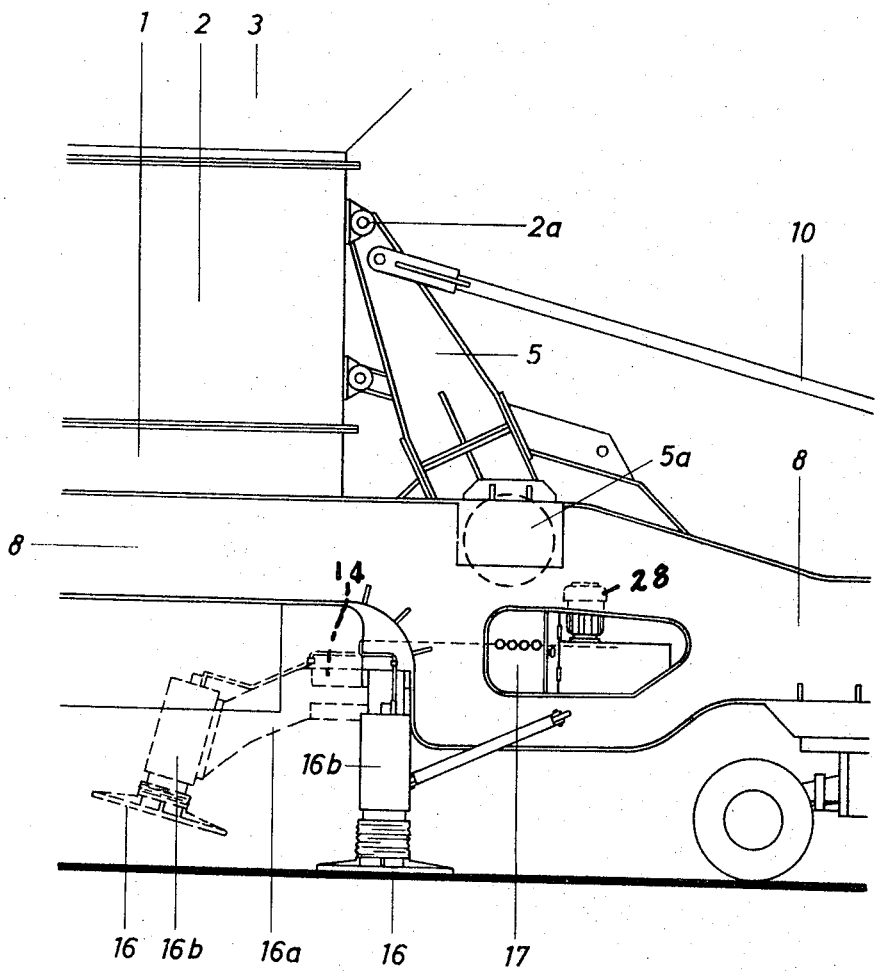
FIGURE 6 is a partial side view showing the hydraulically actuated swinging arms and a hydraulic prop.

Referring to the drawings in more detail, FIGURE 1 shows a side view of the mobile screening and mixing machine of this invention. The frame 8 of this machine is elongated in the direction of travel when compared to the frame shown in the previously named patent.

The frame is supported on wheels as shown for mobile operation and when located at the site where the machine is to be used, supporting props or jacks 16 are lowered below the level of the wheels to raise and support the frame in a level position. The jacks are individually adjusted by hydraulic means 16b which will be described later in detail.

FIGURE 1 also shows the first section 1 of the mixing tower which is secured to the frame 8. The second section 2 of the tower is shown positioned above the first section. A third section 3 having the general shape shown has cooperating edges which mate with the upper perimeter of the second section and is pivotally joined thereto by the pivotal connection 4 which can be disengaged as shown in FIGURE 4a.

The hot bucket conveyor 11 delivers the material to the third section of the tower in known manner and, the operations carried on therein are known and do not form a part of this invention. The tower is of sufficient capacity to handle 150 t./h.

The method and apparatus involved in disassembling the various sections of the mixing tower and the hot bucket conveyor from the operating position shown in FIGURE 1 is as follows:

There is a shaft 5a which is rotatably mounted in the frame transversely of the length thereof as shown in the drawings. There is a pair of arms 5 which are secured at one end to rotate with shaft 5a as seen for example in FIGURES 1 and 8. The upper ends of the arms 5 are pivotally secured to the upper rim of section 2 as shown at 2a.

Near the lower rim of the second section 2 of the mixing tower, a second pair of pivotal connections or bearing blocks 2b is secured thereto to pivotally receive one end of a pair of link members 9. The opposite ends of the link members 9 are pivotally joined at 8c to a pair of bearing blocks 8a and 8b as shown in FIGURES 7 and 8. These bearing blocks are generally U-shaped and are positioned above the shaft 5a and are secured at their ends thereof to the frame member 8 and the lower section 1 as shown in FIGURE 7. When the shaft 5a is actuated to rotate in a counter-clockwise direction as viewed from FIGURE 1, arms 5 which are fixed to rotate therewith are also pivoted in a counter-clockwise direction and together with links 9, pivot section 2 about a horizontal axis as shown in dashed outline in FIGURE 3 until the section 2 settles upon the frame 8 as also shown in the same figure.

The arms 5 also have bars or links 10 pivotally connected at one end to the uppermost end at 5c. The opposite ends of links 10 are pivotally secured at 11a to the housing of the hot bucket conveyor 11. The lowermost portion of the conveyor 11 is seated in a pivot bearing 15 on the frame 8.

As the arms 5 are pivoted in the counter-clockwise direction previously mentioned, the conveyor will assume the intermediate position shown in solid line and the final position shown in dashed outline from which the conveyor is mounted on the two piece trailer 12. The conveyor is disconnected from the pivot joints 11a and 15 and is positioned and secured to the two piece trailer consisting of trailer sections 12a and 12b upon which it is transported to a new installation site. It is generally better to disconnect arms 5 from section 2 when lowering the conveyor 11 as shown in FIGURE 2.

After the conveyor is disassembled from the frame, the arms 5 are then connected to the tower section 2. The shaft 5a is then rotated in a counter-clockwise direction to move sections 2 and 3 concurrently as shown in FIGURE 3.

The end of the section 3 opposite the pivotal connection 4 to section 2 has a roller 7 thereon which engages a supporting inclined surface on the frame and on a two section truck 13. The roller 7 is then received in a cooperating recess on truck section 13a to detachably lock the roller 7 therein. Of course, at this time, the conveyor has already been detached from the frame 8.

The arms 5 are further rotated in a counter-clockwise direction until they assume the dashed position shown in FIGURE 3 and then, the rear portion of section 3 can be secured to the second truck section 13b shown in solid in FIGURE 3.

Following the above sequence, of movements, the pin in the pivotal joint 4 can be removed and the section 3 can be supported on its truck means 13 as shown in FIGURE 4a for transportation to a new installation site. The pin may be left in and truck 13 and the frame 8 may be pulled together when moving the units to a new site.

As noted in FIGURE 3, the section 2 comes to rest in an inverted position on frame 8 for transportation to a new site. The hydraulic jacks 16 would be raised to permit the wheels to engage the road or rails depending upon the mode of land transportation, and the frame 8 with sections 1 and 2 thereon is ready for transportation to a new installation site as shown in FIGURE 5.

When the truck sections 13a and 13b are not supporting tower section 3, they may be coupled together as shown in FIGURE 4b in which section 13a is seen to rest on section 13b with known means (not shown) to detachably secure the sections together at the points of contact.

FIGURE 7 shows the means for rotating shaft 5a which may take the form of a crank arm 20 which is secured to the shaft 5a. One end of a reversible hydraulic cylinder 22 is pivotally secured to an anchor plate 24 which in turn is secured to the frame 8. The piston rod 26 extending from the other end of the cylinder 22 is pivotally joined to crank arm 20. By suitable valve arrangements (not shown) and by operatively connecting the cylinder to a source of hydraulic pressure shown diagrammatically as a pump 28, the shaft 5a may be controlled to rotate according to the movements previously described.

FIGURE 6 shows the means for raising the frame 8 above the ground. The jacks 16 are pivotally mounted to the frame 8 at 14 and are pivoted to the position shown in dashed form when not in use. Each one of the jacks has a hydraulic cylinder 16b operatively connected therewith to individually raise and lower each jack. A suitable valve 17 for each jack and hydraulic lines operatively connect each jack with the source of fluid pressure in order individually to adjust the height of each jack.

It is very important that the frame be in a properly leveled position above the ground in order to prevent unanticipated stress on the members when raising and lowering the tower sections and the conveyor and therefore the individually adjustable jacks are necessary. After the frame is properly leveled with water levels on the frame, the shaft may be actuated.

The following procedure is used when erecting the apparatus of this invention at a new site after the frame has ben properly leveled. Section 3 is positioned adjacent to section 2 and the pin is inserted in pivotal joint 4 to hingedly join the sections together. Shaft 5a is then actuated to rotate in a clockwise direction as viewed from FIGURE 1. After the section 2 is in place on section 1, section 3 should also be in place on section 2. Arms 5 are then disconnected from section 2 to enable the arms to be used in raising the conveyor into position.

The conveyor 11 is seated in its pivot 15 on the frame and links 10 are connected to the conveyor and arms 5. The shaft 5a is then actuated to rotate and raise the conveyor into position. The arms 5 may then be secured to pivot joints 2a by the insertion of suitable pins.

It will be understood that this invention is susceptible to modification in order to adapt it to different usages and conditions and accordingly, it is desired to comprehend such modifications within this inventon as may fall within the scope of the appended claims.

What is claimed is:

1. In a mobile screening and mixing machine for preparing bituminous mixtures, a frame, a mixing tower on said frame, said tower comprising; a first section fixedly secured to said frame, a second section pivotally joined to said frame and adapted to be pivoted about a horizontal axis from a first position on said frame to a second position above said first section in cooperating engaging relation therewith, a third section pivotally detachably joined to said second section to be moved therewith to be positioned above said second section in cooperating engagement therewith, and actuating means to pivot said second section from said first position to said second position, a hot bucket conveyor having one end detachably pivotally joined to said frame and link means operatively connected to said actuating means for positioning the remaining end of said conveyor in operating relationship with said third section.

2. The machine as claimed in claim 1 in which said frame is supported and moved on wheels in transit and further comprising jack means carried on the underside of said frame to raise said frame and support it on said jack means which are individually adjustable for leveling said frame.

3. The machine is claimed in claim 1 in which said actuating means are operatively connected to a first side of said second section, and said third section is joined to said second section on a side of said second section which is opposed to said first side.

4. The machine as claimed in claim 3 in which said frame has a greater length than width and in which said third section is adapted to be supported on separate trailer means in alignment with the length of said frame while still being pivotally joined to said second section when said second section is in said first position on said frame to enable said frame to be towed in connection with said third section.

5. The machine as claimed in claim 4 in which said third section has roller means on a side which is opposed to the side which is pivotally connected to said second section, said frame having an inclined surface thereon to receive said roller means when said second section with the third section pivotally connected thereto is moved from said second position to said first position.

6. The machine is claimed in claim 1 in which said actuating means are adaptable for raising said conveyor from a first position in which said conveyor is generally parallel to the ground to a second position in which said remaining end is operatively connected to said third section.

7. The machine as claimed in claim 1 in which said actuating means comprises a shaft horizontally positioned in said frame transversely of the length thereof, a pair of arms each having one end fixed to rotate with said shaft and the other end pivotally detachably joined to the upper portion of a first side of said second section, a first pair of link members each having one end pivotally joined to said frame and the other end pivotally joined to the lower portion of said first side of said second section, said pair of arms and said first pair of link members being adaptable to pivot said second section from said first position to said second position, a second pair of link members each having one end pivotally detachably secured to a side of said conveyor at a point intermediate the ends thereof and the other end of said link members being pivotally detachably secured to one of said arms at said other end for moving said conveyor from a first position from which it can be detached from said frame to a second position where said remaining end of said conveyor is in operating relationship with said third section, said third section being joined to said second section at said upper portion on a side opposed to said first side, and means to pivot said shaft.

8. In combination, a mobile screening and mixing machine for preparing bituminous mixtures comprising a frame having a greater length than width, wheel means for supporting said frame in transit from one location to another, a mixing tower on said frame comprising; a first section fixedly secured to said frame, a second section pivotally joined to said frame and adapted to be pivoted about a horizontal axis from a first position on said frame to a second position above said first section in cooperating engaging relation therewith, a third section pivotally detachably joined to said second section to be moved therewith to be positioned above said second section in cooperating engagement therewith, actuating means to pivot said second section from said first position to said second position, a hot bucket conveyor having one end detachably pivotally joined to said frame and link means operatively connected to said actuating means for positioning the remaining end of said conveyor in operating relationship with said third section, said third section having roller means on a side thereof which is opposed to the pivotal connection with said second section, said frame having an inclined surface thereon to receive said roller means when said second section with the third section pivotally connected thereto is moved to said first position from said second position, separable truck means having a first wheel assembly adapted to support and detachably retain said roller means thereon as said second section with the third section pivotally connected thereto is moved into said first position, said truck means having a second wheel assembly adapted to support said third section when it is disconnected from said second section when the second section is in said first position, second separable truck means adapted to support opposed ends of said conveyor when it is disconnected from said frame, said actuating means being hydraulically powered.

References Cited

UNITED STATES PATENTS

| | | | |
|---|---|---|---|
| 2,945,683 | 7/1960 | Martinson | 259—154 |
| 3,050,159 | 8/1962 | Paulus et al. | 259—154 |
| 3,064,832 | 11/1962 | Heltzell | 259—154 |
| 3,159,288 | 12/1964 | Heise | 259—161 |
| 3,189,327 | 6/1965 | Domenighetti | 259—164 |

WALTER A. SCHEEL, *Primary Examiner.*

ROBERT W. JENKINS, *Examiner.*